(No Model.)

W. W. ST. JOHN.
Piston Packing.

No. 234,819. Patented Nov. 23, 1880.

Attest:
J. Henry Kaiser.
J. A. Rutherford Jr.

Inventor:
William W. St. John.
By James L. Norris.
Atty.

N. PETERS, PHOTO-LITHOGRAPHER, WASHINGTON, D. C.

UNITED STATES PATENT OFFICE.

WILLIAM W. ST. JOHN, OF ST. LOUIS, MISSOURI.

PISTON-PACKING.

SPECIFICATION forming part of Letters Patent No. 234,819, dated November 23, 1880.

Application filed October 26, 1880. (No model.)

*To all whom it may concern:*

Be it known that I, WILLIAM W. ST. JOHN, a citizen of the United States, residing at St. Louis, in the county of St. Louis and State of Missouri, have invented new and useful Improvements in Piston-Packings, of which the following is a specification.

This invention relates to an improvement in devices for forcing out or expanding the expansible packings of pistons uniformly, so as to wear evenly and to enable said packings to resist inward pressure of steam which may force its way between said packings and the inner surface of the cylinder.

The object of the invention is to give the expanding or outward-forcing devices an adjustable pressure upon the packings by means of supports located within the central opening of the packing-ring and easily accessible for adjustment or repair without removing the packings from their seats.

It has been customary to locate springs in recesses or pockets formed in the seats under the expansible packing, and to have these springs adjustable by means of screws extending from the central openings through the seat-rings; but such an arrangement is objectionable on account of the necessity of removing the packings to gain access to the springs, and also on account of the limited adjustment which can be given the springs, and from the cost of forming the seat-rings with the recesses or pockets for the springs.

By my invention these objections are obviated; and to this end it consists, first, in the combination, with a rigid packing seat-ring provided with an annular shoulder or rib and an expansible packing-ring provided with a recess embracing said shoulder, of one or more pins passing loosely through said rigid seat-ring and its shoulder from its interior opening to the packing-ring and an adjustable support bearing against the inner end or ends of said pin or pins and arranged within the interior opening of the said seat-ring, as hereinafter more particularly described; second, in the combination, with a packing seat-ring provided with an annular rib or shoulder and an expansible packing-ring provided with a groove, embracing said rib or shoulder, of a pin or pins passing through said seat-ring and its shoulder from the interior opening of the seat-ring to the packing or elastic support bearing upon the inner end or ends of said pins and arranged within the interior opening of said seat-ring, essentially as hereinafter set forth.

Figure 1:
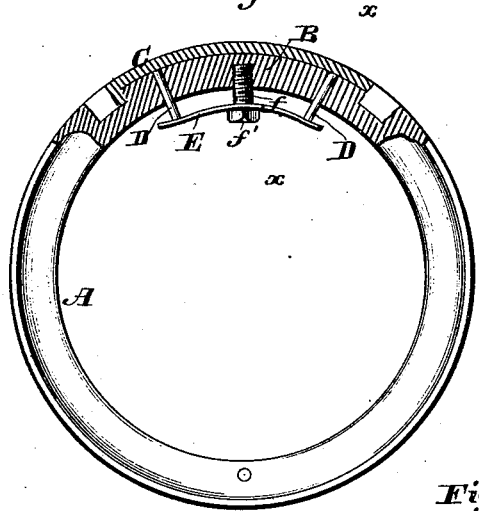
Figure 2:
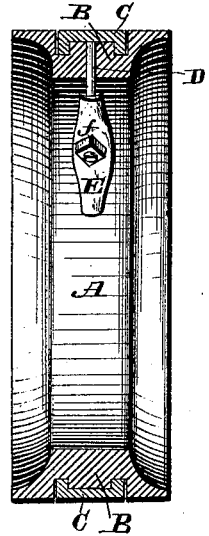
Figure 3:
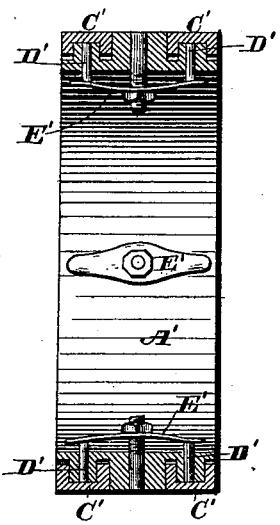
Figure 4:
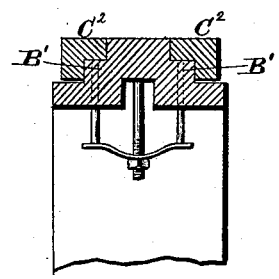
Figure 5:
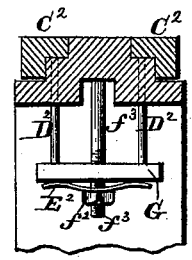

In the accompanying drawings, Figure 1 is a view, partly in elevation, of a piston-packing with portions of the seat-ring and expansible packing broken away, in order to fully show the devices for expanding or forcing outward said packing. Fig. 2 is a section on line *x x* of Fig. 1. Fig. 3 is a diametric section of a double packing provided with my improvement. Fig. 4 is a transverse section of another form of packing to which my invention is applicable. Fig. 5 illustrates a modification of my improvement.

Referring to Figs. 1 and 2, the letter A designates the annular seat-ring, having an outer peripheral groove or recess, from the center of the bottom of which projects an annular rib or shoulder, B; and C is an annular expansible packing-ring, which fits in the groove or recess of the seat-ring, and has in its inner periphery a groove which fits upon and embraces the rib or shoulder B. Radially through the seat-ring and rib or shoulder B are formed holes, in which are loosely arranged pins D, which are supported in position by having their inner ends seated upon the tips of a plate-spring or bow-spring, E, through the center of which passes loosely a screw, *f*, which is tapped into the seat-ring and has a square head, *f'*, upon which the spring rests. On driving the screw into the seat-ring the spring E is caused to press the pins D against the packing-ring C and force it outward with an elastic pressure against the inner surface of the cylinder in which the packing is used. Thus, a uniform outward expansion may be given to the packing-ring, causing it to wear evenly and resist the inward pressure of high-pressure steam which may force its way between the packing and cylinder. The steam pressing alternately on opposite ends of the piston forces the packing-ring laterally alternately against opposite sides of the rib or shoulder B, besides expanding it, and thus the steam is prevented from passing over the tip of said rib or shoulder, and it cannot, therefore, reach the holes through which the pins D pass and leak through them to the interior of the piston.

In Fig. 3 the seat-ring A' has two packing-rings, C', one at each edge, and the spring E' is arranged transversely, so that its tips will act upon pins D', bearing against both rings.

In Fig. 4 the packing rings C² are L-shaped and recessed to fit upon shoulders B' in the sides of the grooves or seats, the rings pressing upon the sides of these shoulders preventing the steam from passing over their tops and reaching the pin-holes.

In Fig. 5, instead of a plate or bow spring a rigid bar, G, is used to support the pins D², and this bar is acted upon by the spring E², which is arranged between the same and the nut $f^2$, which turns upon a stationary screw-post, $f^3$.

Instead of a bow-spring a spiral spring may be arranged upon the screw-pin between the bar and nut; or the spring may in some cases be omitted altogether and a rigid support for the pins used.

Having now explained my invention, I claim—

1. The combination, with a rigid packing seat-ring provided with an annular shoulder or rib and an expansible packing-ring provided with a recess embracing said shoulder, of one or more pins passing loosely through said rigid seat-ring and its shoulder from its interior opening to the packing-ring, and an adjustable support bearing against the inner end or ends of said pin or pins, and arranged within the interior opening of said seat-ring, substantially as described.

2. The combination, with the seat-ring A, provided with the rib or shoulder B, and the annular expansible packing-ring C, provided with a groove or recess embracing said shoulder, of the adjustable pins D, extending through said seat-ring and shoulder, and means for adjusting said pins arranged within the interior opening of the seat-ring, substantially as described.

3. The combination, with a packing seat-ring provided with an annular rib or shoulder and an expansible packing-ring provided with a groove embracing said rib or shoulder, of a pin or pins passing through said seat-ring and its shoulder from the interior opening of the seat-ring to the packing-ring, and an adjustable spring or elastic support bearing upon the inner end or ends of said pins and arranged within the interior opening of said seat-ring, substantially as described.

In testimony whereof I have hereunto set my hand in the presence of two subscribing witnesses.

WM. W. ST. JOHN.

Witnesses:
JAMES L. NORRIS,
JAMES A. RUTHERFORD.